US010696181B2

United States Patent
Hu et al.

(10) Patent No.: US 10,696,181 B2
(45) Date of Patent: Jun. 30, 2020

(54) SYSTEMS AND METHODS FOR CONTROLLING CHARGING OF ELECTRIFIED VEHICLE AUXILIARY BATTERIES

(71) Applicant: FORD GLOBAL TECHNOLOGIES, LLC, Dearborn, MI (US)

(72) Inventors: Changjian Hu, Southgate, MI (US); Josephine S. Lee, Novi, MI (US); James Brian Keyse, Farmington Hills, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 16/055,219

(22) Filed: Aug. 6, 2018

(65) Prior Publication Data
US 2020/0039357 A1 Feb. 6, 2020

(51) Int. Cl.
| B60L 53/20 | (2019.01) |
| H02J 7/04 | (2006.01) |
| B60L 53/14 | (2019.01) |
| B60L 55/00 | (2019.01) |
| B60L 58/12 | (2019.01) |

(52) U.S. Cl.
CPC .............. *B60L 53/20* (2019.02); *B60L 53/14* (2019.02); *B60L 55/00* (2019.02); *B60L 58/12* (2019.02); *H02J 7/045* (2013.01)

(58) Field of Classification Search
CPC .......... B60L 53/20; B60L 53/14; B60L 55/00; B60L 58/12; H02J 7/045

USPC .......................................................... 320/109
See application file for complete search history.

(56) References Cited

U.S. PATENT DOCUMENTS

| 5,945,807 | A | * | 8/1999 | Faulk | ..................... | H02J 7/0063 |
| | | | | | | 320/128 |
| 6,803,746 | B2 | * | 10/2004 | Aker | ..................... | H02J 7/0071 |
| | | | | | | 320/139 |
| 8,706,333 | B2 | * | 4/2014 | Li | .......................... | B60L 58/12 |
| | | | | | | 701/22 |
| 8,712,616 | B2 | * | 4/2014 | Treharne | ................. | B60L 1/003 |
| | | | | | | 701/22 |
| 8,981,727 | B2 | | 3/2015 | Kusch et al. | | |
| 9,371,821 | B2 | * | 6/2016 | Larsen | .................... | F03D 9/257 |
| 9,682,671 | B2 | * | 6/2017 | Ferrel | ..................... | H02M 3/04 |
| 9,758,047 | B2 | * | 9/2017 | Hou | .................... | B60L 11/1811 |
| 9,800,051 | B2 | * | 10/2017 | Laubenstein | ........... | H02M 3/04 |
| 9,815,373 | B2 | | 11/2017 | Perkins et al. | | |
| 9,956,931 | B2 | | 5/2018 | Janarthanam et al. | | |
| 10,084,372 | B1 | * | 9/2018 | Subramaniam | ..... | H02M 1/4208 |
| 10,131,245 | B2 | * | 11/2018 | Hand, III | ................ | B60L 58/13 |
| 10,164,433 | B2 | * | 12/2018 | Miller | ................. | H02J 13/0075 |
| 10,214,111 | B2 | * | 2/2019 | Hand, III | ................ | B60L 58/13 |

(Continued)

*Primary Examiner* — M Baye Diao
(74) *Attorney, Agent, or Firm* — David B. Kelley; Carlson, Gaskey & Olds

(57) ABSTRACT

This disclosure describes vehicle systems and methods for controlling charging of an auxiliary (i.e., low voltage) battery of an electrified vehicle. Exemplary charging methods may dynamically adjust a low voltage setpoint of a power converter during the low voltage support. The proposed systems and methods therefore achieve constrained low voltage support by controlling the power drawn by the power converter at an appropriate level during the low voltage support.

16 Claims, 3 Drawing Sheets

(56) References Cited

U.S. PATENT DOCUMENTS

| | | |
|---|---|---|
| 2006/0102397 A1* | 5/2006 | Buck ................ H01M 8/04559 |
| | | 429/432 |
| 2014/0021916 A1 | 1/2014 | Bilezikjian et al. |
| 2015/0042159 A1* | 2/2015 | Kim ....................... B60L 53/20 |
| | | 307/10.1 |
| 2017/0210233 A1 | 7/2017 | Yu et al. |
| 2017/0355268 A1 | 12/2017 | Roberts et al. |
| 2018/0037124 A1 | 2/2018 | Jang et al. |
| 2018/0050597 A1 | 2/2018 | Hand, III et al. |
| 2018/0050603 A1* | 2/2018 | Hand, III ................ B60L 58/13 |

* cited by examiner

SYSTEMS AND METHODS FOR CONTROLLING CHARGING OF ELECTRIFIED VEHICLE AUXILIARY BATTERIES

TECHNICAL FIELD

This disclosure relates to vehicle systems and methods for dynamically controlling charging of electrified vehicle auxiliary batteries.

BACKGROUND

The desire to reduce automotive fuel consumption and emissions has been well documented. Electrified vehicles are being developed that reduce or completely eliminate reliance on internal combustion engines. In general, electrified vehicles differ from conventional motor vehicles because they can be selectively driven by one or more battery powered electric machines. Conventional motor vehicles, by contrast, rely exclusively on the internal combustion engine to propel the vehicle.

Electrified vehicles may include a high voltage traction battery pack for powering various high voltage loads of the vehicle and an auxiliary battery for powering various low voltage loads of the vehicle. The high voltage battery pack and the low voltage auxiliary battery of some electrified vehicles, such as battery electric vehicles (BEV) and plug-in hybrid electric vehicles (PHEV), are typically charged using energy from a utility grid or other off-board power source. During some auxiliary battery charging conditions, the power drawn by a power converter may be greater than the power that can be provided by the charging system, thereby potentially discharging the high voltage battery pack in order to support the low voltage charging.

SUMMARY

A method according to an exemplary aspect of the present disclosure includes, among other things, controlling charging of a low voltage battery of an electrified vehicle with a vehicle charging system. Controlling the charging includes dynamically adjusting a low voltage setpoint of a power converter of the electrified vehicle during a charging event.

In a further non-limiting embodiment of the foregoing method, the low voltage setpoint establishes how much power is drawn by the power converter for charging the low voltage battery during the charging event.

In a further non-limiting embodiment of either of the foregoing methods, the controlling is performed if a state of charge (SOC) of the low voltage battery is below a predefined threshold.

In a further non-limiting embodiment of any of the foregoing methods, the controlling is performed if the electrified vehicle is on-plug.

In a further non-limiting embodiment of any of the foregoing methods, the controlling is performed if a predefined amount of time has elapsed since charging a high voltage battery pack of the electrified vehicle.

In a further non-limiting embodiment of any of the foregoing methods, dynamically adjusting the low voltage setpoint includes increasing the low voltage setpoint if a charge acceptance of the low voltage battery is below a first predefined threshold and a state of charge of the low voltage battery is below a second predefined threshold.

In a further non-limiting embodiment of any of the foregoing methods, increasing the low voltage setpoint includes increasing the low voltage setpoint by a calibrated value.

In a further non-limiting embodiment of any of the foregoing methods, dynamically adjusting the low voltage setpoint includes decreasing the low voltage setpoint if a charge acceptance of the low voltage battery is above a first predefined threshold and a power draw of the power converter is above a power output of an electric vehicle supply equipment assembly.

In a further non-limiting embodiment of any of the foregoing methods, decreasing the low voltage setpoint includes decreasing the low voltage setpoint by a calibrated value.

In a further non-limiting embodiment of any of the foregoing methods, dynamically adjusting the low voltage setpoint includes decreasing the low voltage setpoint if a power draw of the power converter exceeds a power output of an electric vehicle supply equipment assembly.

A vehicle charging system for an electrified vehicle according to an exemplary aspect of the present disclosure includes, among other things, a low voltage battery for powering low voltage loads of the electrified vehicle and a power converter. A control system is configured to automatically decrease a low voltage setpoint of the power converter if a charge acceptance of the low voltage battery exceeds a predefined threshold and automatically increase the low voltage setpoint if the charge acceptance is below the predefined threshold.

In a further non-limiting embodiment of the foregoing vehicle charging system, the low voltage setpoint establishes how much power is drawn by the power converter for charging the low voltage battery during a charging event.

In a further non-limiting embodiment of either of the foregoing vehicle charging systems, the power converter is a DC/DC converter.

In a further non-limiting embodiment of any of the foregoing vehicle charging systems, the system includes a high voltage battery for powering high voltage loads of the electrified vehicle.

In a further non-limiting embodiment of any of the foregoing vehicle charging systems, the control system is configured to decrease the low voltage setpoint of the power converter if a power draw of the power converter exceeds a power output of an electric vehicle supply equipment assembly.

In a further non-limiting embodiment of any of the foregoing vehicle charging systems, the control system is configured to either increase or decrease the low voltage setpoint by a calibrated value.

In a further non-limiting embodiment of any of the foregoing vehicle charging systems, the calibrated value is a fixed, incremental value.

The embodiments, examples, and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

The various features and advantages of this disclosure will become apparent to those skilled in the art from the following detailed description. The drawings that accompany the detailed description can be briefly described as follows.

DETAILED DESCRIPTION

This disclosure describes vehicle systems and methods for controlling charging of an auxiliary (i.e., low voltage) battery of an electrified vehicle. An exemplary charging method may dynamically adjust a low voltage setpoint of a power converter (e.g., a DC/DC converter) during the low voltage support. The proposed systems and methods provide a constrained low voltage support by controlling a power draw of the power converter at an appropriate level during the low voltage support. These and other features are discussed in greater detail in the following paragraphs of this detailed description.

Figure 1:
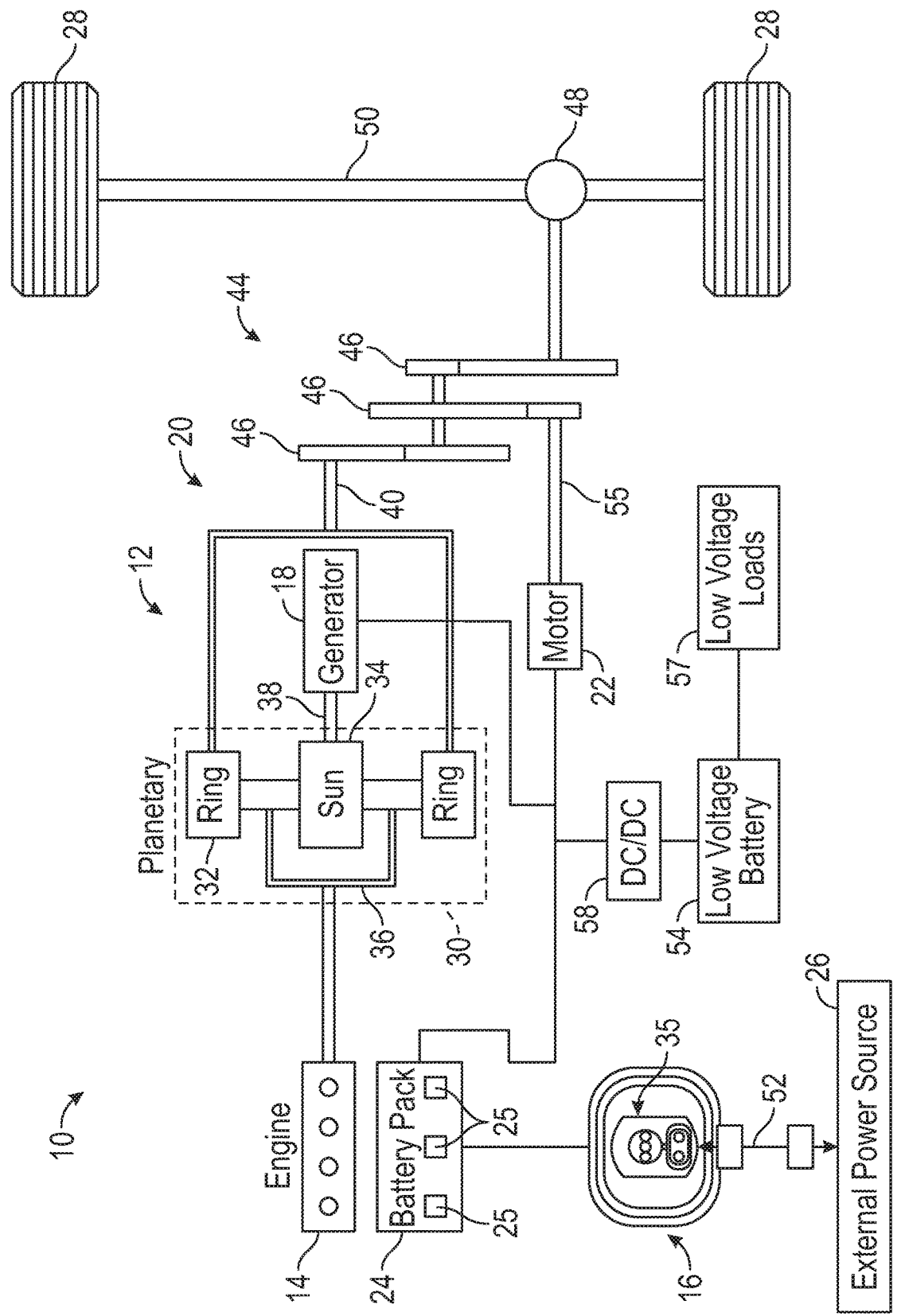
FIG. 1 schematically illustrates a powertrain of an electrified vehicle.

FIG. 1 schematically illustrates a powertrain 10 for an electrified vehicle 12. In an embodiment, the electrified vehicle 12 is a plug-in hybrid electric vehicle (PHEV). In another embodiment, the electrified vehicle is a battery electric vehicle (BEV).

In an embodiment, the powertrain 10 is a power-split powertrain system that employs a first drive system and a second drive system. The first drive system may include a combination of an engine 14 and a generator 18 (i.e., a first electric machine). The second drive system includes at least a motor 22 (i.e., a second electric machine) and a battery pack 24. In this example, the second drive system is considered an electric drive system of the powertrain 10. The first and second drive systems generate torque to drive one or more sets of vehicle drive wheels 28 of the electrified vehicle 12. Although a power-split configuration is depicted in FIG. 1, this disclosure extends to any hybrid or electric vehicle including full hybrids, parallel hybrids, series hybrids, mild hybrids, micro hybrids, etc.

The engine 14, which in an embodiment is an internal combustion engine, and the generator 18 may be connected through a power transfer unit 30, such as a planetary gear set. Of course, other types of power transfer units, including other gear sets and transmissions, may be used to connect the engine 14 to the generator 18. In one non-limiting embodiment, the power transfer unit 30 is a planetary gear set that includes a ring gear 32, a sun gear 34, and a carrier assembly 36.

The generator 18 can be driven by the engine 14 through the power transfer unit 30 to convert kinetic energy to electrical energy. The generator 18 can alternatively function as a motor to convert electrical energy into kinetic energy, thereby outputting torque to a shaft 38 connected to the power transfer unit 30. Because the generator 18 is operatively connected to the engine 14, the speed of the engine 14 can be controlled by the generator 18.

The ring gear 32 of the power transfer unit 30 may be connected to a shaft 40, which is connected to vehicle drive wheels 28 through a second power transfer unit 44. The second power transfer unit 44 may include a gear set having a plurality of gears 46. Other power transfer units may also be suitable. The gears 46 transfer torque from the engine 14 to a differential 48 to ultimately provide traction to the vehicle drive wheels 28. The differential 48 may include a plurality of gears that enable the transfer of torque to the vehicle drive wheels 28. In one embodiment, the second power transfer unit 44 is mechanically coupled to an axle 50 through the differential 48 to distribute torque to the vehicle drive wheels 28. In one embodiment, the power transfer units 30, 44 are part of a transaxle 20 of the electrified vehicle 12.

The motor 22 can also be employed to drive the vehicle drive wheels 28 by outputting torque to a shaft 55 that is also connected to the second power transfer unit 44. In one embodiment, the motor 22 is part of a regenerative braking system. For example, the motor 22 can each output electrical power to the battery pack 24.

The battery pack 24 is an exemplary electrified vehicle battery. The battery pack 24 may be a high voltage traction battery pack that includes a plurality of battery assemblies 25 (i.e., battery arrays or groupings of battery cells) capable of outputting electrical power to operate the motor 22, the generator 18, and/or other electrical loads of the electrified vehicle 12. Other types of energy storage devices and/or output devices can also be used to electrically power the electrified vehicle 12.

The electrified vehicle 12 may additionally include a low voltage battery 54, which may also be referred to as an auxiliary battery. The low voltage battery 54 may be provided for powering various low voltage loads 57 of the electrified vehicle 12. Non-limiting examples of low voltage loads include infotainment systems, lighting systems, power windows, power seats, cooling fan, A/C compressor, instrument clusters, control modules, etc. A power converter 58, such as DC/DC converter, may be provided to convert a high voltage DC output from the battery pack 24 to a low voltage DC supply that is compatible with the low voltage battery 54.

In an embodiment, the low voltage battery 54 is a 12V battery. However, in this disclosure, the term "low voltage battery" could include any battery that is less than 60V. The low voltage battery 54 and the low voltage loads 57 are generally part of a low-voltage system of the electrified vehicle 12, whereas the high voltage battery pack 24 is generally part of a relatively high voltage system of the electrified vehicle 12. Thus, the high voltage battery pack 24 can be used to power propulsion of the electrified vehicle 12, whereas the low voltage battery 54 does not generally power propulsion of the electrified vehicle 12.

The electrified vehicle 12 may also be equipped with a charging system 16 for charging the energy storage devices (e.g., battery cells) of the battery pack 24 and the low voltage battery 54. The charging system 16 may be connected to an external power source 26 (e.g., utility/grid power from an electrical grid) for receiving and distributing power throughout the electrified vehicle 12.

In an embodiment, the charging system 16 includes a vehicle inlet assembly 35 located on-board the electrified vehicle 12, and an electric vehicle supply equipment (EVSE) assembly 52 (or charge cord of a charging station) that can be operably connected between the vehicle inlet assembly 35 and the external power source 26. The vehicle inlet assembly 35 may include one or more ports adapted to receive a coupler of the EVSE assembly 52. The vehicle inlet assembly 35 is therefore configured to receive power from the external power source 26 and then supply the power to the battery pack 24 and/or the low voltage battery 54.

The charging system 16 may be equipped with power electronics for converting AC power received from the external power source 26 to DC power for charging the energy storage devices of the battery pack 24. The charging system 16 is also configured to accommodate one or more conventional voltage sources from the external power source 26 (e.g., 110 volt, 220 volt, etc.).

The powertrain 10 shown in FIG. 1 is highly schematic and is not intended to limit this disclosure. Various additional components could alternatively or additionally be employed by the powertrain 10 within the scope of this disclosure. In addition, the teachings of this disclosure could be applied to any electrified vehicle that has programmable charging windows and both high and low voltage batteries/power sources.

The power rating of the EVSE assembly 52 (e.g., 1.4 kW for level one charging) may be lower than the power rating of the power converter 58 (e.g., 3 kW). Therefore, the EVSE assembly 52 may be incapable of providing the full input power required by the power converter 58 for supporting maintenance of the low voltage battery 54 while the electrified vehicle 12 is on-plug. In these situations, the power draw of the power converter 58 can potentially discharge the high voltage battery pack 24 in order to support the low voltage battery 54 charging, which could undesirably result in the customer observing a decreasing state of charge (SOC) of the battery pack 24 while on-plug. This disclosure proposes systems and methods for decreasing the likelihood of such an undesirable event when providing low voltage support of the low voltage battery 54.

Figure 2:
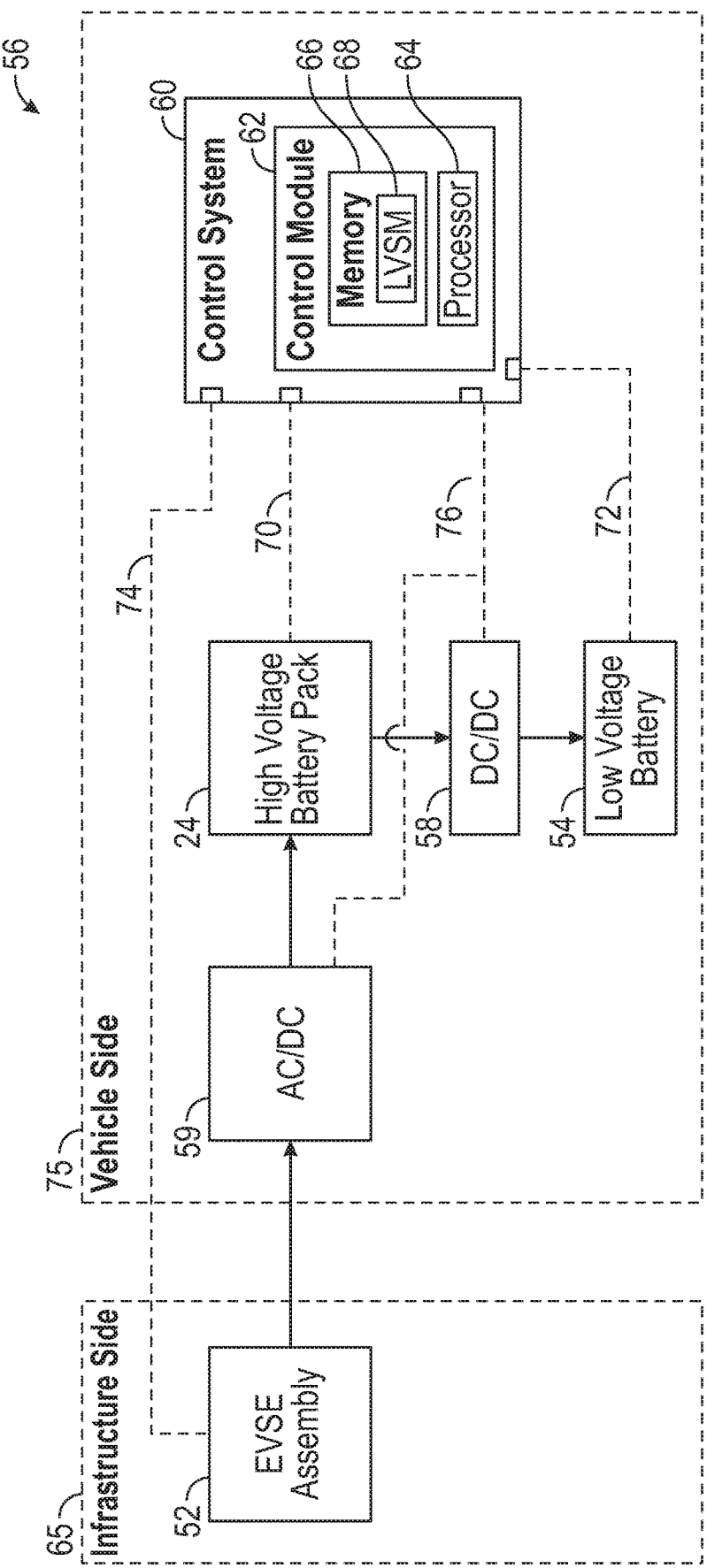
FIG. 2 schematically illustrates a vehicle charging system of an electrified vehicle.

FIG. 2 is a highly schematic depiction of a vehicle charging system 56 that may be employed by an electrified vehicle, such as the electrified vehicle 12 of FIG. 1. In an embodiment, the vehicle charging system 56 includes the high voltage battery pack 24, the low voltage battery 54, the EVSE assembly 52, the power converter 58, another power converter 59, and a control system 60. The various components of the vehicle charging system 56 are shown schematically to better illustrate the features of this disclosure. In an embodiment, the EVSE assembly 52 is part of an infrastructure side 65 of the vehicle charging system 56, and the high voltage battery pack 24, the low voltage battery 54, the power converter 58, the power converter 59, and the control system 60 are part of a vehicle side 75 of the vehicle charging system 56.

The exemplary vehicle charging system 56 may be configured to control charging of the low voltage battery 54 without shedding more power than the EVSE assembly 52 can supply during a charging event. For example, the power consumed by the power converter 58 during a charging event can be calculated based on the currents and voltages measured at the output side of the power converter 58. The power output of the power converter 58 can be controlled by adjusting its low voltage setpoint, which is the setpoint that establishes how much power is drawn by the power converter 58 for charging the low voltage battery 54 during the charging event. The low voltage setpoint is therefore also the voltage control target of the power converter 58. The higher the low voltage setpoint, the higher the power drawn by the power converter 58 during the charging event. In an embodiment, the low voltage setpoint of the power converter 58 can be dynamically adjusted during charging events in order to control the power draw at an appropriate level such that both the low voltage battery 54 and the high voltage battery pack 24 can either be charged at the same time or even charged with a desired split of the total charging power.

The power converter 59, which may be an AC/DC power converter, is disposed between the EVSE assembly 52 and the high voltage battery pack 24. The power converter 59 is configured to convert AC power from the EVSE assembly 52 to DC power for charging the high voltage battery pack 24.

The control system 60 of the vehicle charging system 56 may control charging of the high voltage battery pack 24 and the low voltage battery 54 by controlling operation of the EVSE assembly 52 and the power converters 58, 59. For example, the control system 60 may instruct these and other charging components when to begin charging, when to end charging, the length of charging, the power levels of the charging, etc.

The control system 60 may be part of an overall vehicle control system or could be a separate control system that communicates with the vehicle control system. The control system 60 may include one or more control modules 62 equipped with executable instructions for interfacing with and commanding operation of various components of the vehicle charging system 56. For example, in an embodiment, each of the battery pack 24, the EVSE assembly 52, and the power converter 58 include a control module, and these control modules can communicate with one another over a controller area network to control charging of the high voltage battery pack 24 and the low voltage battery 54. In another embodiment, each control module 62 of the control system 60 includes a processing unit 64 and non-transitory memory 66 for executing the various control strategies and modes of the vehicle charging system 56.

The control module 62 may be equipped with a low voltage system management (LVSM) feature 68 for determining an initial low voltage setpoint of the power converter 58 and for dynamically adjusting (i.e., increasing or decreasing) the low voltage setpoint as necessary during charging events. In an embodiment, the LVSM feature 68 is programmed as an algorithm that is stored in the non-transitory memory 66 of the control module 62 and which can be executed by the processing unit 64 during charging events.

The control module 62 of the control system 60 may receive and process various inputs for controlling the charging of the high voltage battery pack 24 and the low voltage battery 54. A first input to the control module 62 may include battery information 70 from the high voltage battery pack 24. The battery information 70 may be communicated from a battery electric control module associated with the high voltage battery pack 24 and may include information such as the current battery state of charge (SOC), battery temperature, battery age, etc.

A second input to the control module 62 may include battery information 72 from the low voltage battery 54. The battery information 72 may include information such as current battery SOC, battery temperature, battery voltage, battery health, age, etc.

A third input to the control module 62 may include charger information 74 received from the EVSE assembly 52. The charger information 74 may include information such as the power rating of the EVSE assembly 52, current plug status (i.e., is the EVSE assembly 52 plugged into the vehicle or unplugged), available power, etc.

A fourth input to the control module 62 may include converter information 76 received from the power converters 58, 59. The converter information 76 may include the power rating of the power converters 58, 59, the current low voltage setpoint of the power converter 58, the current power draw of the power converter 58, etc.

The LVSM feature 68 may utilize the various inputs 70-76 in order to dynamically adjust the low voltage setpoint of the power converter 58 during charging events. In this way, the vehicle charging system 56 can achieve constrained low voltage charge support under level 1 charging in order to control the power that is shed by the power converter 58 at an appropriate level and without decreasing the SOC of the high voltage battery pack 24.

Figure 3:
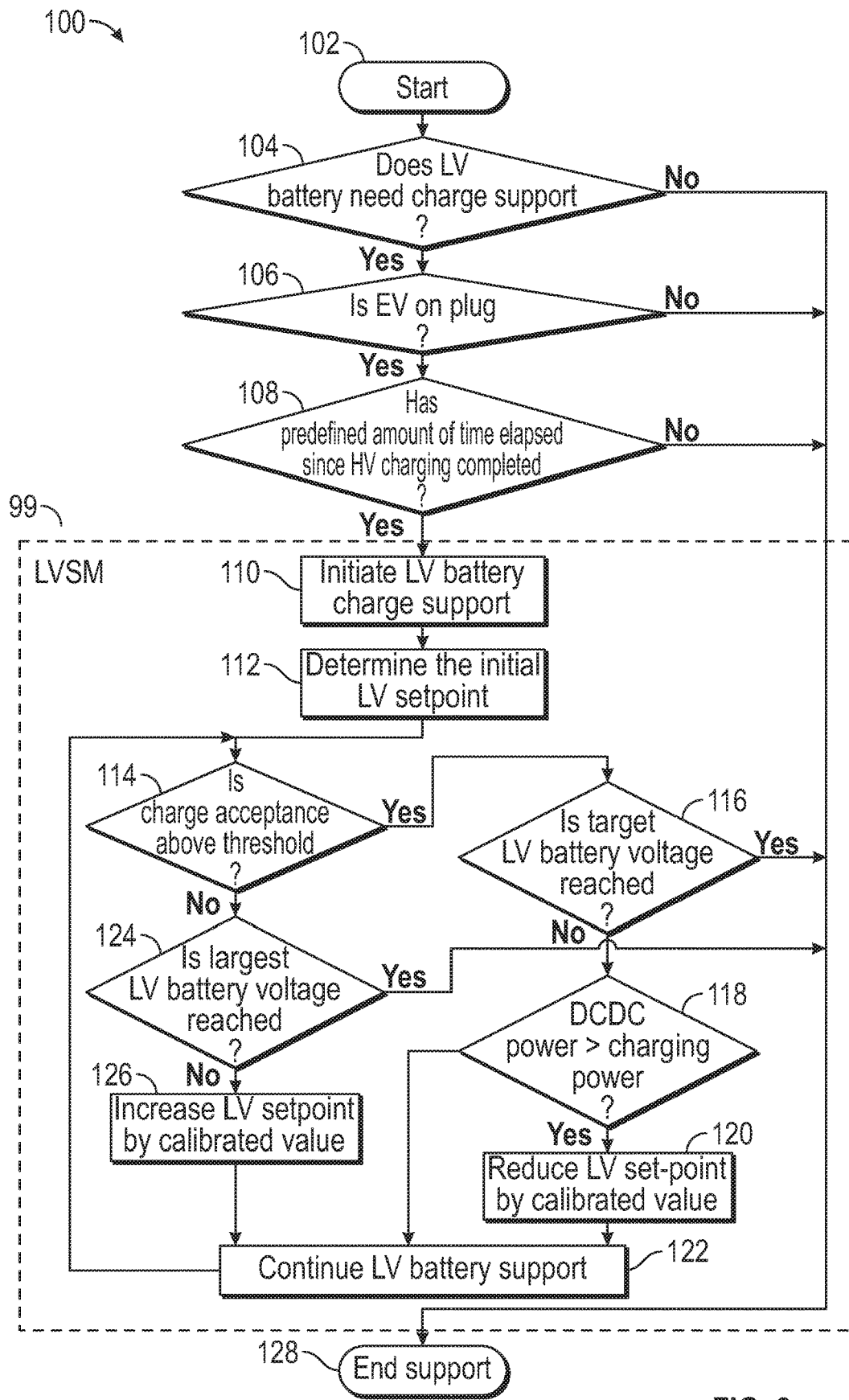
FIG. 3 schematically illustrates an exemplary method for controlling charging of a low voltage battery of an electrified vehicle by dynamically adjusting a low voltage setpoint of a power converter of the electrified vehicle.

FIG. 3, with continued reference to FIGS. 1-2, schematically illustrates an exemplary method 100 for controlling charging of the low voltage battery 54 of the electrified vehicle 12 in a manner that minimizes the use of energy from the high voltage battery pack 24. In an embodiment, the control module 62 of the control system 60 of the vehicle charging system 56 is programmed with one or more algorithms adapted to execute the exemplary method 100. For example, the LVSM feature 68 can be programmed and executed as an algorithm within the control module 62.

The method 100 begins at block 102. At block 104, the control module 62 may determine whether the low voltage battery 54 requires charge support. For example, the low voltage battery 54 may power the low-voltage loads 57 even when the electrified vehicle 12 is keyed off and not operating, such as when the vehicle is stored, parked, transported, etc. A charge level (i.e., SOC) of the low voltage battery 54 can be reduced due to powering the low-voltage loads 57. If the electrified vehicle 12 is keyed off for an extended period of time, the charge level of the low voltage battery 54 can be depleted to a point at which it is unable to power the low-voltage loads. This could prevent, among other things, starting the electrified vehicle 12 after the extended period. Because of this, the state of health of the low voltage battery 54 may be periodically monitored in order to maintain the charge level of the low voltage battery 54 above a predefined threshold. This periodic monitoring of the low voltage battery 54 may be referred to as charge support, charge management, or charge maintenance of the low voltage battery 54. If charge support is not needed at block 104, the method 100 may end at block 128.

If the low voltage battery 154 does require charge support, the control module 62 may determine whether the electrified vehicle 12 is on-plug (i.e., the EVSE assembly 52 has been connected to an external power source and the electrified vehicle) at block 106. For example, the control module 62 may periodically analyze signals received from the EVSE assembly 52 to determine whether it has been connected to the external power source 26 and the vehicle inlet assembly 35 of the electrified vehicle 12. If a YES flag is returned at block 106, the method 100 proceeds to block 108. Alternatively, if a NO flag is returned at block 106, the method 100 may end at block 128.

At block 108, the control module 62 may next determine whether a predefined amount of time, such as twenty-four hours, has elapsed since the high voltage battery pack 24 completed charging. In an embodiment, the vehicle charging system 56 may be commanded to wake-up approximately twenty-four hours after completing the charging of the high voltage battery pack 24. Waking-up the vehicle charging system 56 twenty-four hours subsequent to completing charging provides for a cost-effective charge management of the low voltage battery 54. If it is determined at block 108 that the predefined amount of time has not passed since charging the high voltage battery pack 24, the method 100 may end at block 128.

In an embodiment, if 1) the low voltage battery 54 requires support, 2) the electrified vehicle 12 is on-plug, and 3) the predefined amount of time has passed since charging of the high voltage battery pack 24 was completed, the control module 62 may execute the LVSM feature 68. This is schematically illustrated in FIG. 3 at dashed block 99. Execution of the LVSM feature 68 may include the steps illustrated by blocks 110-126 of the method 100, which are each described in greater detail below.

Charge support of the low voltage battery 54 is initiated at block 110. The LVSM feature 68 of the control module 62 may then determine an initial low voltage setpoint of the power converter 58 at block 112. The initial low voltage setpoint may be determined based on the information provided by a monitoring system associated with the low voltage battery 54. Once the initial low voltage setpoint is determined, the LVSM feature 68 may dynamically adjust the setpoint until the power is equated to EVSE power.

Next, at block 114, the LVSM feature 68 may determine whether a charge acceptance of the low voltage battery 54 is above a predefined threshold. The charge acceptance of the low voltage battery 54 represents an amount of charge that can currently be accepted by the low voltage battery 54 for increasing its SOC. A charge acceptance that is smaller than the predefined threshold indicates that low voltage support will soon not be required (i.e., low voltage support can be completed).

The method 100 may proceed to block 116 if the charge acceptance of the low voltage battery 54 is determined to be above the predefined threshold at block 114. At block 116, the LVSM feature 68 may determine whether a target voltage (i.e., a desired SOC) of the low voltage battery 54 has been reached. If a YES flag is returned, the method 100 may end at block 128. If, however, a NO flag is returned, the method 100 may proceed to block 118.

The LVSM feature 68 may determine whether the power drawn by the power converter 58 currently exceeds the power output of the EVSE assembly 52 at block 118. If YES, the method 100 proceeds to block 120 and the low voltage setpoint of the power converter 58 is automatically reduced by a calibrated value (i.e., a fixed, incremental value). Low voltage charge support of the low voltage battery 54 may then continue at block 122.

The method 100 may alternatively proceed to block 124 if the charge acceptance of the low voltage battery 54 is determined to be below the predefined threshold at block 114. At block 124, the LVSM feature 68 may determine whether a target voltage (i.e., a desired SOC) of the low voltage battery 54 has been reached. If a YES flag is returned, the method 100 may end at block 128. If, however, a NO flag is returned, the method 100 may proceed to block 126.

At block 126, the low voltage setpoint of the power converter 58 may be automatically increased by a calibrated value (i.e., a fixed, incremental value). Low voltage charge support of the low voltage battery 54 may then continue at block 122.

In view of the foregoing, the adjustment of the low voltage setpoint depends not only on the charge acceptance of the low voltage battery 54 but also on whether the low voltage charging power exceeds the available power of the EVSE assembly 52 and whether the targeted voltage of the low voltage battery 54 has been reached. A charge acceptance smaller than the predefined threshold generally means that the low voltage battery 54 has been charged to the current setpoint. Therefore, if the targeted voltage is higher than the setpoint, the low voltage setpoint has to be increased to continue charging the low voltage battery 54. On the other hand, if the charge acceptance is larger than threshold (meaning that the low voltage battery 54 is being charged normally) and the charging power exceeds the available power of the EVSE assembly 52, the high voltage battery pack 24 will be discharged. Therefore, reducing the low voltage setpoint is necessary to avoid discharging the high voltage battery pack 24.

The vehicle systems and methods of this disclosure improve low voltage battery charge support by dynamically adjusting a low voltage setpoint of a power converter. The proposed systems and methods provide constrained low voltage support under level 1 charging to control the amount of power that is shed by the power converter at an appropriate level. Accordingly, the low voltage battery and high voltage battery pack can be charged at the same time or with a desired split of the total charging power, and customers will unlikely be confused by a decreasing SOC of the high voltage battery pack during the low voltage charge support.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A method, comprising:
controlling charging of a low voltage battery of an electrified vehicle with a vehicle charging system, wherein controlling the charging includes dynamically adjusting a low voltage setpoint of a power converter of the electrified vehicle during a charging event,
wherein dynamically adjusting the low voltage setpoint includes:
decreasing the low voltage setpoint when a power draw of the power converter exceeds a power output of an electric vehicle supply equipment assembly.

2. The method as recited in claim 1, wherein the low voltage setpoint establishes how much power is drawn by the power converter for charging the low voltage battery during the charging event.

3. The method as recited in claim 1, wherein the controlling is performed when a state of charge (SOC) of the low voltage battery is below a predefined threshold.

4. The method as recited in claim 3, wherein the controlling is performed when the electrified vehicle is on-plug.

5. The method as recited in claim 4, wherein the controlling is performed when a predefined amount of time has elapsed since charging a high voltage battery pack of the electrified vehicle.

6. The method as recited in claim 1, wherein dynamically adjusting the low voltage setpoint includes:
decreasing the low voltage setpoint when a charge acceptance of the low voltage battery is above a first predefined threshold and a power draw of the power converter is above a power output of an electric vehicle supply equipment assembly.

7. The method as recited in claim 6, wherein decreasing the low voltage setpoint includes decreasing the low voltage setpoint by a calibrated value.

8. A method, comprising:
controlling charging of a low voltage battery of an electrified vehicle with a vehicle charging system, wherein controlling the charging includes dynamically adjusting a low voltage setpoint of a power converter of the electrified vehicle during a charging event,
wherein dynamically adjusting the low voltage setpoint includes:
increasing the low voltage setpoint when a charge acceptance of the low voltage battery is below a first predefined threshold and a state of charge of the low voltage battery is below a second predefined threshold.

9. The method as recited in claim 8, wherein increasing the low voltage setpoint includes increasing the low voltage setpoint by a calibrated value.

10. A vehicle charging system for an electrified vehicle, comprising:
a low voltage battery for powering low voltage loads of the electrified vehicle;
a power converter; and
a control system configured to automatically decrease a low voltage setpoint of the power converter when a charge acceptance of the low voltage battery exceeds a first predefined threshold and automatically increase the low voltage setpoint when the charge acceptance is below the first predefined threshold and a state of charge of the low voltage battery is below a second predefined threshold.

11. The vehicle charging system as recited in claim 10, wherein the low voltage setpoint establishes how much power is drawn by the power converter for charging the low voltage battery during a charging event.

12. The vehicle charging system as recited in claim 10, wherein the power converter is a DC/DC converter.

13. The vehicle charging system as recited in claim 10, comprising a high voltage battery for powering high voltage loads of the electrified vehicle.

14. The vehicle charging system as recited in claim 10, wherein the control system is configured to decrease the low voltage setpoint of the power converter when a power draw of the power converter exceeds a power output of an electric vehicle supply equipment assembly.

15. The vehicle charging system as recited in claim 10, wherein the control system is configured to either increase or decrease the low voltage setpoint by a calibrated value.

16. The vehicle charging system as recited in claim 15, wherein the calibrated value is a fixed, incremental value.

* * * * *